United States Patent
Peltz

(10) Patent No.: US 11,416,828 B2
(45) Date of Patent: Aug. 16, 2022

(54) SYSTEMS AND METHODS FOR OPTIMIZING TIME SLOT YIELD RATES

(71) Applicant: Publius Inc., New York, NY (US)

(72) Inventor: Bradley G. Peltz, Mount Kisco, NY (US)

(73) Assignee: Publius Inc., New York, NY (US)

(*) Notice: Subject to any disclaimer, the term of this patent is extended or adjusted under 35 U.S.C. 154(b) by 80 days.

(21) Appl. No.: 16/580,844

(22) Filed: Sep. 24, 2019

(65) Prior Publication Data

US 2021/0090031 A1    Mar. 25, 2021

(51) Int. Cl.
*G06Q 10/10* (2012.01)
*G06F 16/2457* (2019.01)

(52) U.S. Cl.
CPC ... *G06Q 10/1095* (2013.01); *G06F 16/24578* (2019.01)

(58) Field of Classification Search
CPC combination set(s) only.
See application file for complete search history.

(56) References Cited

U.S. PATENT DOCUMENTS

| | | | |
|---|---|---|---|
| 7,512,454 B1 * | 3/2009 | Li | G06Q 50/04 700/97 |
| 2012/0191501 A1 * | 7/2012 | Olliphant | G06Q 10/1093 705/7.19 |
| 2014/0257852 A1 * | 9/2014 | Walker | G16H 50/20 705/3 |
| 2015/0081371 A1 * | 3/2015 | Tang | G06Q 10/1095 705/7.19 |
| 2017/0300868 A1 * | 10/2017 | Johnson | G06Q 10/06314 |
| 2018/0012195 A1 * | 1/2018 | Nagaraj | G06Q 10/1095 |

* cited by examiner

*Primary Examiner* — Arif Ullah
(74) *Attorney, Agent, or Firm* — Redbrick IP, P.C.

(57) ABSTRACT

Systems and methods discussed herein are related to optimizing time slot yield rates. A method can include: determining that an earlier time slot has become available; identifying a set of users corresponding with preexisting time slots scheduled for a time later than the available earlier time slot; ranking the set of users according to ranking criteria; selecting, based on ranking the set of users, a subset of top ranked users eligible for the available time slot; sending a set of messages to the subset of users indicating that the earlier time slot is available; receiving a message from a first user of the subset of users indicating that the first user is willing to replace their corresponding preexisting time slot with the available earlier time slot; and replacing the first user's corresponding preexisting time slot with the available earlier time slot.

17 Claims, 10 Drawing Sheets

US 11,416,828 B2

SYSTEMS AND METHODS FOR OPTIMIZING TIME SLOT YIELD RATES

BACKGROUND

The inability for patients to see their providers in a timely fashion a well-known problem in the health care industry. Often, a patient is told they must wait weeks or months to see a provider. Meanwhile, providers attempt to be able to see additional patients by over-booking their schedules. Often, providers may double or triple book their schedule in anticipation of one or more patients failing to attend their scheduled appointment.

Serious problems are caused by current systems. For example, if patients can't see a provider for months, they may decide not to bother with the health care system, and thereby go without the care they need. Sometimes, a patient may make an appointment to see their primary care provider for a month or two in advance, but prior to that appointment, decide to visit a health clinic to see a different provider due to the clinic's shorter wait time. Meanwhile, the patient may neglect to cancel the original appointment with their primary care provider until a time very near the appointment. In this case, when a patient cancels their appointment with their primary care provider on short notice just before that appointment, the primary care provider may not be able to schedule a patient to fill that time.

SUMMARY

Embodiments herein provide technical solutions to the aforementioned and other technical problems.

In general, in one aspect, embodiments relate to a method for optimizing time slot yield rates. The method can include: determining that an earlier time slot has become available; identifying a set of users corresponding with preexisting time slots scheduled for a time later than the available earlier time slot; ranking the set of users according to ranking criteria; selecting, based on ranking the set of users, a subset of top ranked users eligible for the available time slot; sending a set of messages to the subset of users indicating that the earlier time slot is available; receiving a message from a first user of the subset of users indicating that the first user is willing to replace their corresponding preexisting time slot with the available earlier time slot; and replacing the first user's corresponding preexisting time slot with the available earlier time slot.

In general, in one aspect, embodiments relate to a system for optimizing time slot yield rates. The system can include: a computer processor; a memory; and a time slot scheduling engine executing on the computer processor and configured to: determine that an earlier time slot has become available; identify a set of users corresponding with preexisting time slots scheduled for a time later than the available earlier time slot; rank the set of users according to ranking criteria; select, based on ranking the set of users, a subset of top ranked users eligible for the available time slot; send a set of messages to the subset of users indicating that the earlier time slot is available; receive a message from a first user of the subset of users indicating that the first user is willing to replace their corresponding preexisting time slot with the available earlier time slot; and replace the first user's corresponding preexisting time slot with the available earlier time slot.

In general, in one aspect, embodiments relate to a non-transitory computer-readable storage medium having instructions for optimizing time slot yield rates. The instructions are configured to execute on at least one computer processor to enable the computer processor to: determine that an earlier time slot has become available; identify a set of users corresponding with preexisting time slots scheduled for a time later than the available earlier time slot; rank the set of users according to ranking criteria; select, based on ranking the set of users, a subset of top ranked users eligible for the available time slot; send a set of messages to the subset of users indicating that the earlier time slot is available; receive a message from a first user of the subset of users indicating that the first user is willing to replace their corresponding preexisting time slot with the available earlier time slot; and replace the first user's corresponding preexisting time slot with the available earlier time slot.

Other aspects of the invention will be apparent from the following description and the appended claims.

BRIEF DESCRIPTION OF THE DRAWINGS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
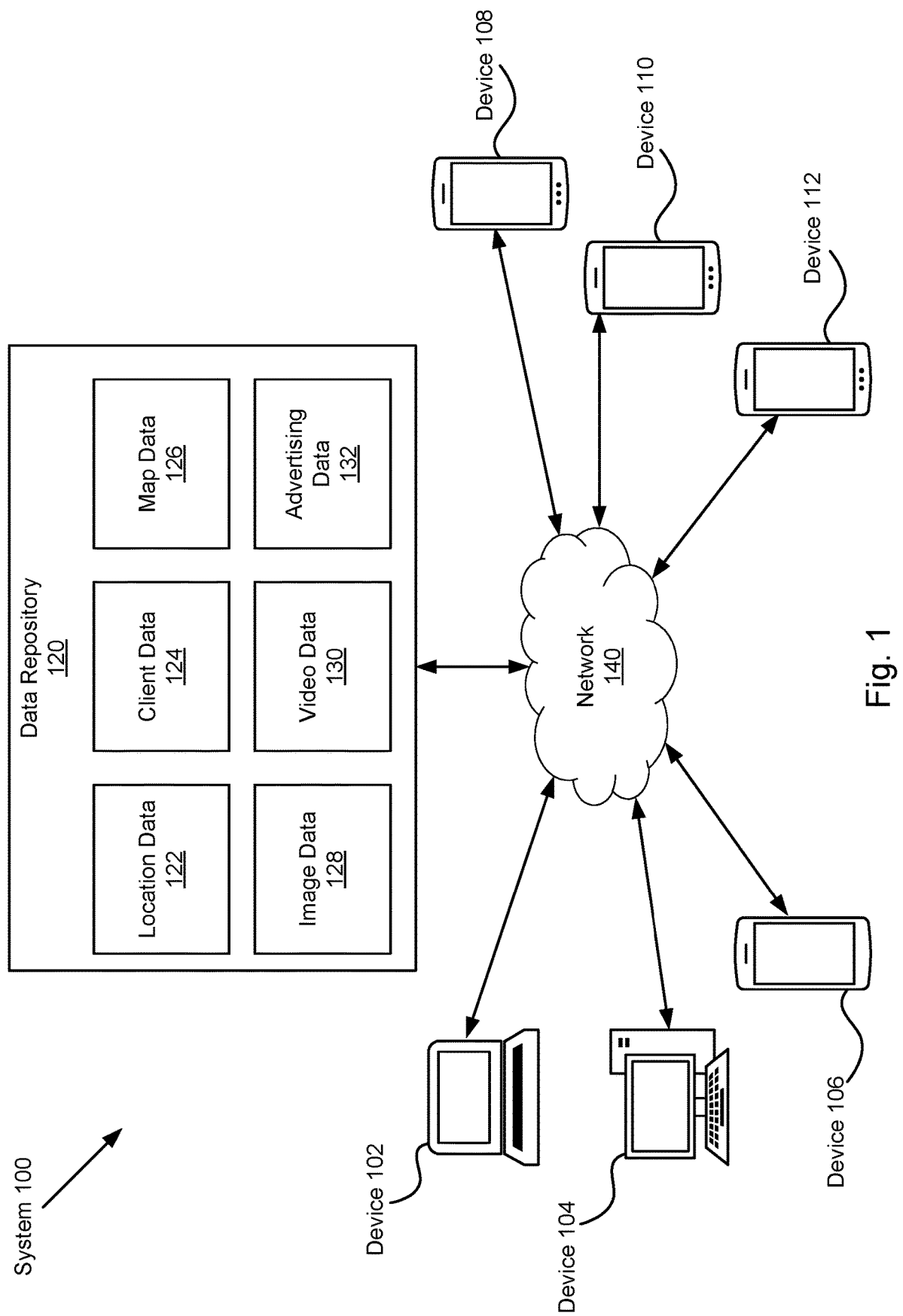
FIG. 1 illustrates a schematic diagram of a system, in accordance with one or more embodiments of the invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Various embodiments of the inventions described herein include systems and methods for an automated scheduling solution that seamlessly integrates into health-care related computer systems (e.g., electronic health record systems, appointment scheduling systems, etc.). In one or more embodiments described herein, systems link provider availability with patient demand by offering a prioritized waitlist of patients with the opportunity to claim open appointment times (also referred to as time slots), thereby significantly improving scheduling/rescheduling capabilities. Herein, systems and methods are described that increase the ease of use for both patients (also known as users) and providers, and increase the efficiency of health services. Techniques described herein allow providers and health systems to recoup revenue lost from cancelled appointments, or appointment time slots that otherwise become available (e.g., a provider makes more time slots available). It should be understood that embodiments herein are not limited to use in the healthcare industry, but extend to other applications that would benefit from scheduling and rescheduling technological improvements.

With systems described herein, patients can choose providers, book appointments, fill out check-in-forms, and complete most of the other tasks involved in receiving any type of treatment. These systems may guide patients through the step-by-step process of securely booking an appointment with the desired provider.

In many areas, particularly urban areas, people find it difficult to find time to see a doctor, dentist, or other provider often due to their busy schedules. In fact, studies have shown that patients are so busy that they may skip an appointment, or not even cancel an appointment they plan to miss if cancelling the appointment requires calling the provider. In some cases, before a patient's preexisting appointment, they may decide to see another provider and fail to notify the provider with whom they have the preexisting appointment.

Herein, inventions discuss ways to mitigate problems by making it easier for patients to schedule and cancel appointments, at least in part by providing patients with an easy means to reschedule a preexisting appointment to an earlier time, to a different provider, and/or a more convenient location. As should be understood by one skilled in the art, in one or more embodiments, a provider may refer to a physician, a dentist, a nurse practitioner, a medical assistant, a dental assistant, a behavioral health specialist, a health center, a hospital, etc. Also, in one or more embodiments, a data structure such as a database may include appointments with corresponding patients, providers, potential alternative appointment times, whether an appointment is movable, locations, preexisting appointment times, historical patient data (e.g., health status), historical provider data, related patient information, provider specialties, patient family data, patient contact data, provider contact data, etc.

In one or more embodiments described herein, Short Message Service (SMS, also referred to as text messaging) technology is used to: (1) provide patients with a more convenient way to cancel, schedule, and/or reschedule appointments; and (2) leverage security provided by their client devices and/or telecommunication networks. In one or more embodiments, patients and/or providers may respond to a system via SMS messaging without the need to open a web page, portal, or other application other than the text messaging application. For example, a text messaging application of a mobile phone device. This, of course, may be one advantage of systems described herein. Whereas some systems may send a text message where, when interacted with, may send a patient to another application (such as a patient portal or website, which may require a patient to enter a password, e.g., to comply with privacy laws), in one or more embodiments described herein a system may allow a patient to reschedule their appointment through only the usage of an SMS application and/or without requiring a patient to open a second application to reschedule their appointment. Of course, in some embodiments, it is envisioned that alternatively or in addition to text messages, communication/messages may be sent between a system and a patient via other services, communication mediums, and/or platforms (e.g., such as email, smart phone messaging "apps," patient portals, telephonic voice calls, Voice-Over-IP calls, etc.).

In one or more embodiments, a message may be sent to a patient when there is an opening for an appointment sooner than the patient's preexisting appointment. For example, if a provider's appointment is cancelled, and the patient's preexisting appointment is with that provider, a message may be sent to the patient asking whether the patient would like to replace their preexisting appointment with the earlier cancelled appointment. In one or more embodiments, a patient may receive a message indicating that an earlier appointment is open, instead of other prospective patients, according to a ranking of the patients based on an earlier opening being available at a certain location, the patient's health insurance, the patient's health condition/ailment, a type of provider's specialty, a time of day of the patient's preexisting appointment, a patient's expression of willingness or interest in an earlier appointment or position on a waitlist, etc. The various ranking criteria may be weighted.

In response to the message, the patient may reply with a response—accepting the potential rescheduled appointment or rejecting it. For example, a patient may see the message indicating that their appointment may be rescheduled to an earlier date, and accept the option to reschedule, causing a system to reschedule their existing appointment to the new time (which may be when another appointment was cancelled). In one or more embodiments, potential preexisting appointments that may be rescheduled may be identified, and patients corresponding to those appointments may be sent messages asking if they would like to reschedule, and the first patient to respond will have their appointment rescheduled. In such a case, a system may send a message to patients that were not the first to respond indicating that the earlier appointment opening is no longer available. It should be understood that other responses are possible, for example, the patient may reply with a response requesting additional decision-making time, additional information about the potential rescheduled appointment or the existing appointment potentially to be canceled, etc.

In one or more embodiments, in response to the received response from the patient accepting the earlier appointment, the system may reschedule the patient's preexisting appointment to the earlier time, location, and provider, and send a confirmation message to the patient (e.g., via SMS).

In one or more embodiments, a patient may send a message to a rescheduling system indicating that they would like to cancel their preexisting appointment. This may cause the system to send messages to other patients asking if they would like that appointment instead. In some cases, one or more appointment reminder notifications may be sent to a patient to remind them of an upcoming appointment. A patient may be given an option to respond indicating that they'd like to cancel or reschedule their preexisting appointment and/or confirming their preexisting appointment. In one or more embodiments, if a patient does not respond to an appointment reminder notification, the system may perform the same actions it would have had the patient responded cancelling their appointment.

As discussed herein, scheduling patients at optimal times can reduce wait lists, and text messages may optimize timeliness of rescheduling appointments while leveraging safety and privacy provided by telecommunication networks. For example, a text message may contain a hyperlink (commonly referred to as a "link") allowing a patient to easily cancel or confirm a preexisting appointment, and/or reschedule a preexisting appointment. In one or more embodiments, a patient can perform such actions without opening another application on their electronic device (e.g., a smart phone, laptop, etc.). Of course, in some embodiments, in response to selecting a link in a text message, an electronic device may open another application such as an interne browser that may allow a patient to cancel, reschedule, and/or request/generate an appointment.

In one or more embodiments, providers' schedules may be at least double or triple booked. For example, a provider may schedule 2 or more appointments for the same period of time, knowing they will be able to see all of the patients within that time period, or expecting one or more patients to not attend (e.g., a "no-show") or cancel their appointment. In one or more embodiments, systems and methods described herein may schedule and/or reschedule appointments differently based on policies associated with double or triple bookings. For example, if a cancellation is made and the cancelled appointment was part of a double booking, a system may not send messages to other patients asking them whether they would like to change their preexisting appointment with the cancelled appointment. As another example, if two appointments are cancelled which were scheduled during a triple booking time period, a system may ask one or more patients if they would like to reschedule their existing appointment with one of the cancelled appointments. Other methods may exist for maximizing efficiency when a provider uses double or triple booking.

In one or more embodiments, appointments may only be rescheduled for a patient within a particular time period. For example, a patient may only be able to reschedule their appointment to a time earlier than their preexisting appointment, or in some cases later than their preexisting appointment. In one or more embodiments, a patient may only reschedule their appointment within a month, a week, 5 days, 3 days, 2 days, or 1 day. Further, in one or more embodiments, a movable appointment (e.g., one that may be identified as a preexisting appointment for which messages should be sent to their respective patients to ask if the patient would like to reschedule) may be determined based on its time, location, and/or provider. For example, a system may send messages to patients with preexisting appointments to ask if they would like to reschedule in response to the preexisting appointments being within a particular time period.

In one or more embodiments, a system may send messages to patients asking whether they would like to reschedule their appointment based on a location of an appointment. For example, if one or more patients reside in New York, N.Y., and are waiting on appointments scheduled for one month in the future at a hospital in Baltimore, Md., if an appointment becomes available at a hospital in New York a message may be sent to those patients by the system asking them if they would like to reschedule their appointment to the one in New York. In one or more embodiments, these messages may be sent to patients regardless of whether their preexisting appointments in Baltimore are scheduled before or after the opening in New York. (note that the opening may be a cancelled appointment).

As with time, and location, in one or more embodiments other schedule openings may cause a system to send messages to patients based on various appointment characteristics. For example, a message may be sent if an appointment becomes open with a preferred provider, as well as a preferred time or preferred location. In one or more embodiments, patient characteristics may be filtered prior to messages being sent. For example, in some cases patients without a particular type of insurance may not be sent messages when an appointment opens (e.g., if the provider does not accept the patient's insurance).

In one or more embodiments, a patient may be sent to another provider or location where they may be able to be seen earlier. For example, one or more patients' appointments are scheduled with a first physician and a second physician has a cancellation, messages may be sent asking patients whether they would like to be seen by the second physician. As with location, in various embodiments the appointment time of the rescheduled/cancelled appointment may be before or after a patient's preexisting appointment.

In one or more embodiments, a system may ask patients if they would like to see another provider with an open appointment in response to that provider having one or more attributes. Such attributes may be generated by the system, machine learning, and/or received from one or more patients. For example, messages asking patients whether they would like to reschedule their appointments to be with another provider may only be sent to patients that need the type of specialty service that provider provides. As another example, patients may choose providers they would like to visit if an appointment opens, and they may receive messages asking if they would like to reschedule with one of those providers when they have an appointment open, but not with other providers that were not chosen by the patients.

In some embodiments, providers may be associated with a score (e.g., a quality score), and messages asking whether patients would like to be rescheduled for an appointment with a provider may only be sent to particular patients based on the provider's score.

In one or more embodiments, if a new provider becomes available (e.g., the provider is new to the health center or practice), messages may be sent to patients asking whether they would like to reschedule to meet with the new provider. In some embodiments, based on one or more provider's availabilities and/or patient characteristics (e.g., language spoken, location, specific health issue), one or more patients may have their preexisting appointments automatically rescheduled such that they are with the new provider(s). In one or more embodiments, patients may receive a message asking if they would like to stay with their preexisting provider, and if they do not respond to the message or respond too late (e.g., after a certain number of other patients respond), the patients may have their preexisting appointments rescheduled automatically.

In one or more embodiments, various preexisting appointments may be changed based on a relationship between providers. For example, if an appointment with a first provider opens, it may only be offered to patients that have preexisting appointments with a second provider that has a relationship with the first provider. For example, the second provider may have a contract with the first provider, such that messages are sent to patients that are willing to see the first provider, or messages are sent to patients only giving them the option to reschedule with the first provider.

In one or more embodiments, telehealth may be implemented in conjunction with the system. For example, a patient may see a provider via a video conference. In various embodiments, these appointments may be scheduled and rescheduled as with other appointments described herein. Although, generally telehealth appointments are location agnostic (e.g., location independent). In one or more embodiments telehealth appointments may be accessed via a text message link, allowing for fast and convenient service for patients.

In one or more embodiments, an appointment type may be changed to a different appointment type (e.g. via SMS). For example, an in-person visit may be changed to a virtual visit (e.g., webcam, telephonic, etc.) via SMS. In another example, a patient may have an in-person appointment scheduled for 3:00 p.m. on October 1. At 10:00 a.m. on October 1, the patient may cancel or attempt to cancel the in-person appointment. A system may then prompt the patient to convert their 3:00 p.m. appointment into a telehealth appointment (e.g., via text message). The patient may then accept the 3:00 p.m. telehealth appointment (e.g., via text message), and the system may update the appointment such that it is a telehealth appointment. Accordingly, the appointment time is salvaged. In one or more embodiments, a message may also be sent to a provider indicating that the in-person appointment has changed to a telehealth appointment.

In one or more embodiments, an appointment type and time may be changed to a different appointment type and time (e.g. via SMS). For example, a patient may have an in-person appointment scheduled for 3:00 on October 1. A system may send a message (e.g., a text message) to the patient offering the patient a telehealth appointment at an earlier date (e.g., 10:00 a.m. on September 15). A patient may accept or deny the offer via text message.

In some embodiments, patient rescheduling may be manually approved or rejected. This may be before a text is sent, after it is sent, before the preexisting appointment, after the preexisting appointment, before a cancelled appointment, after a cancelled appointment, etc. For example, a system may send a message to a patient asking if they would like to reschedule their preexisting appointment for 5 days from today, when their preexisting appointment is only 3 days from today. In such an example, a system administrator may provide a system with input indicating that it did not act properly by suggesting a later date. In one or more embodiments, a system may include configuration rules and/or policies, which may dictate when, where, and how to reschedule an appointment, etc. In the example described above, by manually inputting information telling the system it incorrectly offered to reschedule an appointment because the rescheduled appointment would have been for a later time than the preexisting appointment, the configuration and/or policies of the system may be updated to reflect the manually provided input. In some embodiments, machine learning or artificial intelligence may be implemented such that a system becomes better at determining whether a correct configuration and/or policy was implemented when suggesting an appointment, rescheduling an appointment, etc.

In one or more embodiments, metadata may be used to determine whether patients are related. Metadata may include patient information such as a patient's contact information, relative information, location information, family health history, health information, genetic information, etc. In some embodiments, metadata such as when two patients scheduled their appointments may be used to determine/estimate whether they are related and/or whether to reschedule or offer rescheduling of appointments to one or more of the related patients. For example, in response to two patients scheduling appointments for times that overlap and/or times that are adjacent to one another at least one time (or at least two or more times), a system may consider the two patients to be related. In such a case, if one patient cancels a preexisting appointment a system may send a message to a related patient and ask whether they would like to cancel their preexisting appointment. As another example, if an appointment becomes available that is earlier than one of the patients' preexisting appointments, a system may suggest that both patients reschedule their appointments.

Further, in one or more embodiments, a provider may cancel their appointments for a period of time (e.g., hours, a day, or multiple days). For example, if a physician cancelled a day of preexisting appointments (or several days of preexisting appointments), the physician could cancel the preexisting appointments via an EHR system and the systems and methods described herein could prompt certain actions via a text message. The preexisting appointments for the period of time may all be cancelled through a bulk cancel operation, instead of one by one (e.g., via an EHR system). In one or more embodiments, these actions may include, but are not limited to: notifying a patient that their preexisting appointment is cancelled; notifying a patient that their appointment needs to be rescheduled; offering a patient a new appointment time (or several times to select from); providing a patient with the ability to select a new appointment; and/or confirming the new appointment.

As another example, when Physician A learns he will be out of town on September $5^{th}$, instead of calling patients to reschedule their appointments, Physician A could cancel all patient appointments for September $5^{th}$ via an EHR system (e.g., instead of one by one through the HER system, cancelling all patient appointments through a bulk operation that cancels all appointments on September $5^{th}$). Patients could be notified via SMS and be prompted to reschedule their appointments to another date, which could be before or after September $5^{th}$.

FIG. 1 illustrates an example schematic diagram of system 100, in accordance with one or more embodiments of the invention. System 100 may include devices 102, 104, 106, 108, 110, and 112 (e.g., electronic devices such as a computer, a smart phone, and/or a tablet). Devices 102, 104, and 106 may be devices belonging to a first user, which the first user may use to access system 100. Devices 108, 110, and 112 may be smart phones belonging to other users (e.g., not the first user, a connection, a non-connection). In some embodiments, devices 108, 110, and 112 may include a video camera at a location, an electronic assistant such as an Amazon Echo™ etc. Once a first user accesses system 100, the first user may be able to view a map of an area, locations, reviews of locations, locations of connections, locations of non-connections, etc. The various devices included in system 100 may be connected wirelessly via network 140.

FIG. 1 also includes example data repository 120. It should be understood that data repository 120 may include more, or less, data than shown in FIG. 1. Further, it should be understood that data repository 120 may be stored on a variety of devices such as a server, a multi-tenant environment (e.g., the cloud), etc.

Data repository 120 may include location data 122, client data 124, map data 126, image data 128, video data 130, and/or advertising data 132. Location data 122 may include data including, but not limited to: maps of various cities or areas, locations (also referred to as points of interest)—which may include night clubs and sporting events, the locations of connections, the locations of non-connections, and/or the location of a user.

Client data 124 may include information associated with clients, which may be defined as users or client devices, and include data such as, but not limited to: a current location of a client, previous locations of a client, and/or information about a client (e.g., music preference or activity preferences in the case of a user, or device type or operating system in the case of a client device).

Map data 126 may include information associated with a map, including, but not limited to: names of location, locations' coordinates, locations' addresses, data associated with transportation (e.g., directions, bus routes, available taxi services), connection information, and/or non-connection information.

Image data 128 may include image information which may include, but is not limited to: one or more images of the interior of one or more locations, one or more images of one or more users/connections/people/animals at one or more locations, one or more images of the area outside of one or more locations (e.g., a line outside of a night club), and/or one or more images not captured by a user (e.g., received by system 100 from the Internet).

Similarly, video data 130 may include, but is not limited to: one or more videos of the interior of one or more locations, one or more videos of one or more users/connections/people/animals at one or more locations, one or more videos of the area outside of one or more locations (e.g., a line outside of a night club), and/or one or more videos not captured by a user (e.g., received by system 100 from the Internet).

In some embodiments, data repository 120 may include advertising data 132, which may be shown on device 102, 104, 106, 108, 110, 112. This information may be shown on a map, or in some cases within a review to save screen real estate. The advertising data may include information including, but not limited to: a video, text, images, information associated with a location, information associated with a location where device 106, 108, 110, 112 is located or where it has previously been, and/or information associated with a location where a connection is located.

Figure 2:
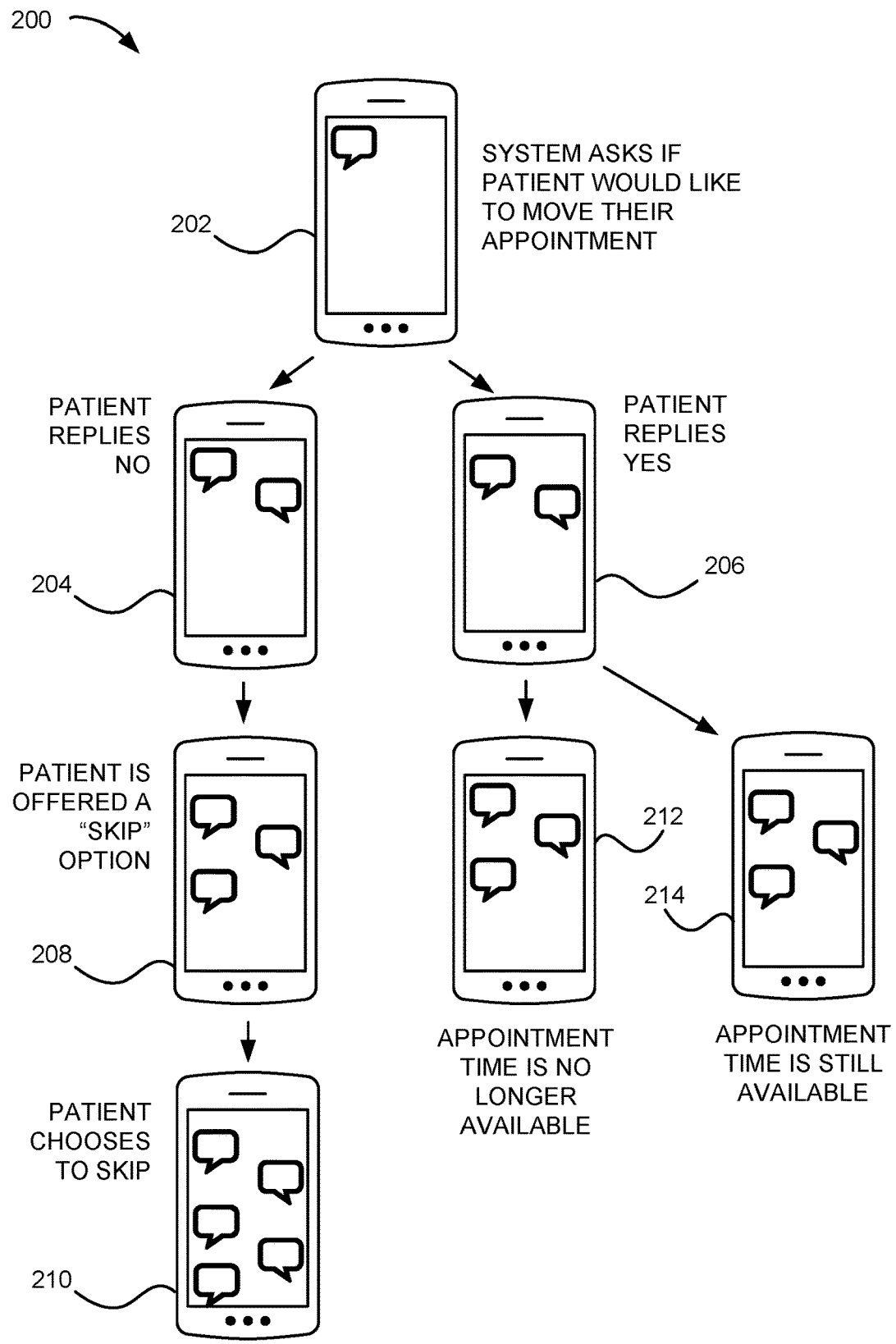
FIG. 2 illustrates a flowchart of a method for rescheduling an appointment, in accordance with one or more embodiments of the invention.

FIG. 2 illustrates a flowchart 200 of a method for rescheduling an appointment, in accordance with some embodiments. While the various steps in the flowchart are presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 2 should not be construed as limiting the scope of the invention.

In STEP 202, a system asks if a patient would like to move their preexisting appointment. As would be understood by a person skilled in the art, asking a person if they would like to move (also referred to as rescheduling) their appointment may include a system sending a message to a patient's client device as shown in FIG. 2. This message may include their appointment's time, provider, and/or location, and/or the potential appointment's time, provider, and/or and location. In one or more embodiments, a patient's appointment may be referred to as a "patient's future appointment," and a potential appointment may be referred to as a "cancelled appointment," since the potential appointment may correspond to a cancelled appointment's time, provider, and/or location In STEP 204, a patient replies to a system indicating that they would not like to reschedule their appointment. For example, a patient may send a message to the system indicating that they do not want to cancel and/or reschedule their appointment time and/or location, as shown in FIG. 2.

Figure 8:
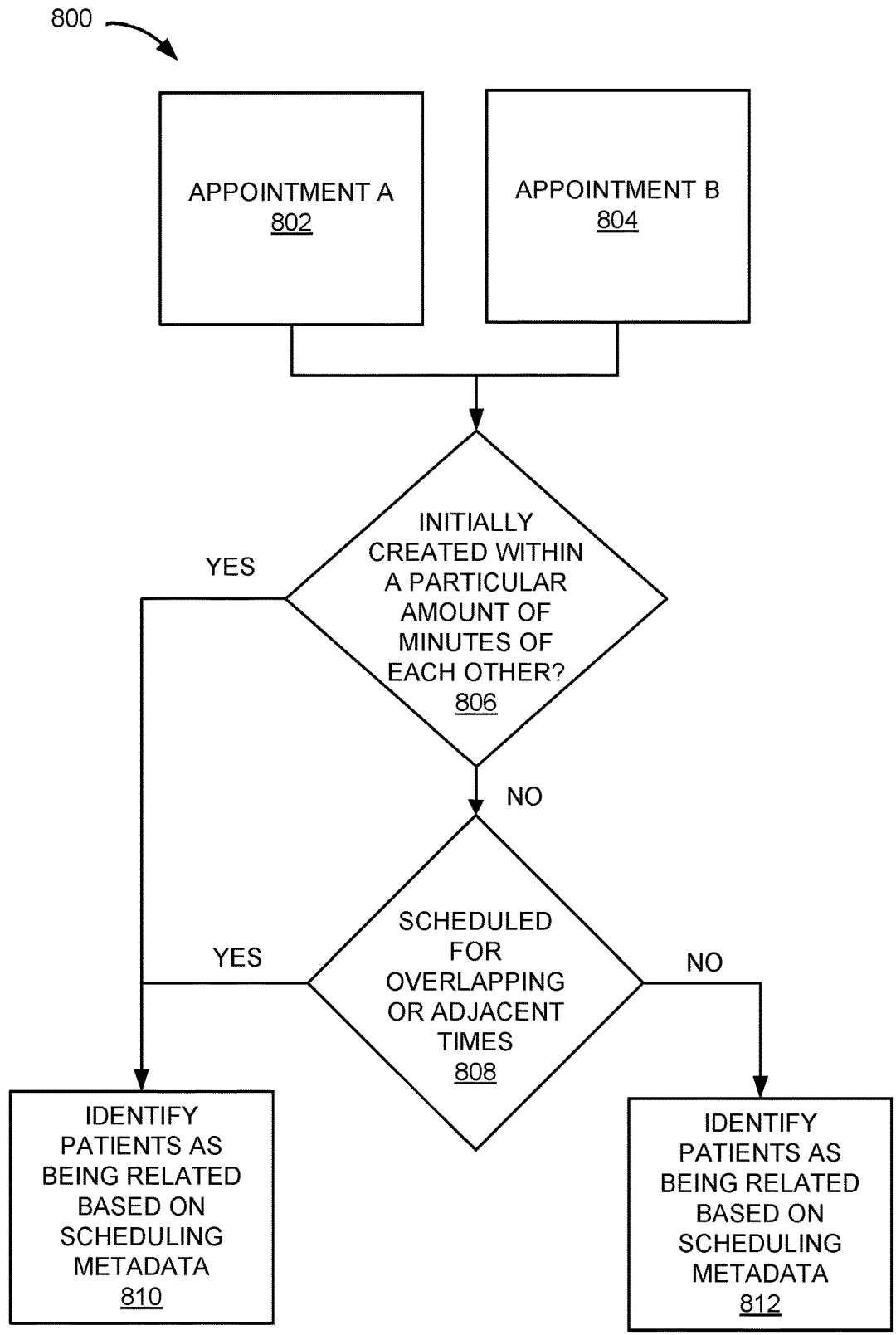
FIG. 8 illustrates a flowchart of a method for identifying patients as being related based on scheduling metadata, in accordance with some embodiments.

In STEP 208, in response to a patient indicating that they would not like to reschedule their appointment, a patient is offered a "skip" option. For example, in response to a patient sending a message indicating that they would not like to reschedule their appointment, they may receive a message asking whether they would like to skip an open appointment slot (which may be at a time, location, and/or with a provider of a cancelled appointment), as shown in FIG. 8.

In STEP 210, a system may send a patient a message confirming that the patient chose to skip the open appointment slot.

In STEP 206, in response to a system asking whether a patient would like to move their appointment, a patient replies indicating that they would like to move their appointment to the open appointment slot (in other words, reschedule their appointment from its original, future time, with an available time).

In STEP 212, in response to the potential appointment no longer being available, the system sends the patient a message indicating that the open appointment slot is no longer available. An appointment may not be available for a variety of reasons, such as another patient requesting the potential appointment (e.g., the potential appointment's location, time, and/or provider), or another patient requesting to move their future appointment to the potential appointment.

Figure 3:
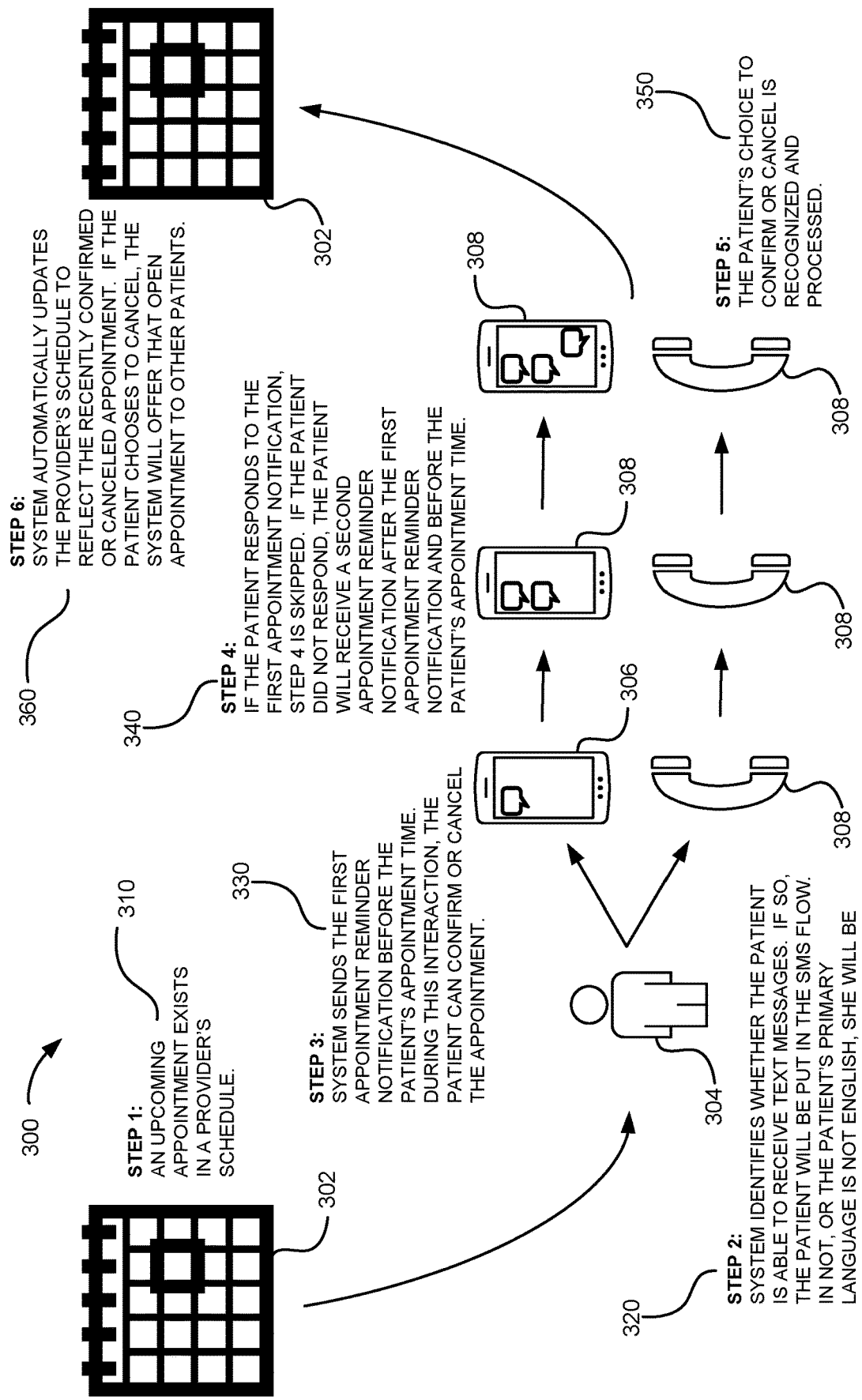
FIG. 3 illustrates a flowchart of a method for or rescheduling appointments, in accordance with one or more embodiments of the invention.

FIG. 3 illustrates a flowchart 300 of a method for rescheduling an appointment, in accordance with some embodiments. While the various steps in the flowchart are presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 3 should not be construed as limiting the scope of the invention.

In STEP 310, a determination is made that an upcoming open appointment exists in a provider's schedule 302. This upcoming open appointment may correspond to a patient and/or a location in addition to the provider.

In STEP 320, a system identifies whether a patient 304 is able to receive text messages (e.g., receive SMS messages via an electronic device 306). If patient 304 is able to receive text messages, the system proceeds with filling the upcoming open appointment via electronic device 306. If patient 304 is unable to receive text messages, the system proceeds with filling the upcoming open appointment via telephone 308 (e.g., vocal communication).

In STEP 330, the system sends a first appointment reminder notification to a patient before the patient's appointment time. This message may be sent via text message to electronic device 306 or over a phone 308. At STEP 330, a patient may confirm or cancel the appointment.

In STEP 340, a patient may respond to the first appointment reminder notification (e.g., the patient may confirm the appointment or cancel the appointment). If the patient responds to the first appointment reminder notification, the method proceeds to STEP 350. If the patient does not respond, a system may send the patient a second appointment reminder notification. This second appointment reminder notification may be sent before the patient's original/current appointment time, and after the first appointment reminder notification.

In STEP 350, a patient's choice to confirm or cancel their appointment is determined by the system. The system may receive this information from a patient via text message, voice, etc.

In STEP 360, a system automatically updates the provider's schedule 302 to reflect whether the appointment is either confirmed or cancelled by the patient. If the appointment was cancelled by the patient, the appointment is offered to another patient.

Figure 4:
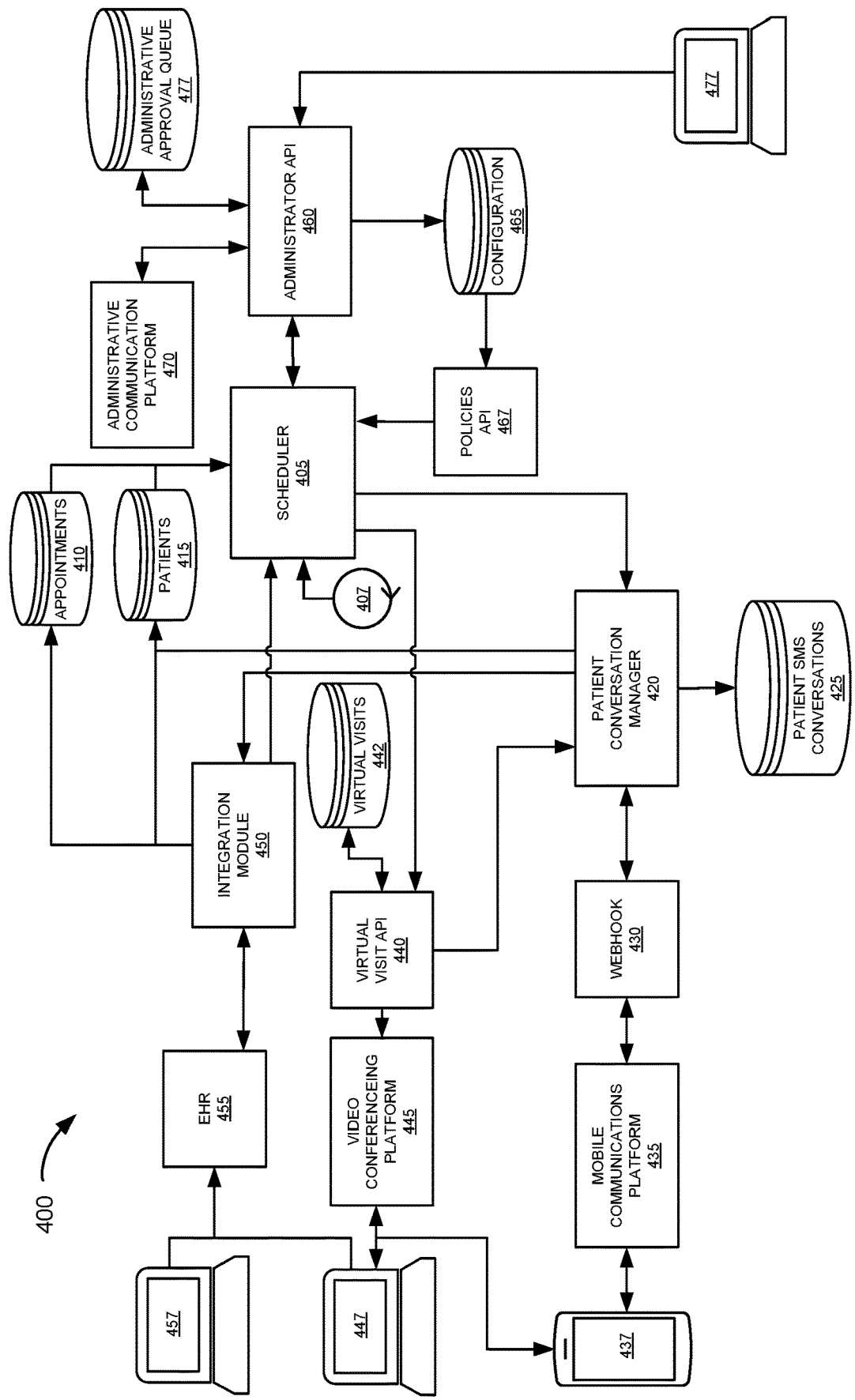
FIG. 4 illustrates a schematic diagram of a system, in accordance with one or more embodiments of the invention.

FIG. 4 illustrates a schematic diagram of a system 400, in accordance with some embodiments. While various components of an example system are shown, it should be understood that more or fewer components may be included. In addition, although arrows are shown to assist the reader to understand data flows, they are shown as an example, and data may flow in other directions between various components regardless of the example arrows.

In one or more embodiments, example system 400 includes a first administrator terminal 457 and second administrator terminal 477. System 400 may also include a provider terminal 447 and an electronic device 437. While these components are shown as laptops and a smart phone, they may be any type of electronic device with a display. For example, a provider terminal may be a smart phone, and an administrator terminal may be a desktop computer. In one or more embodiments, text messages may be sent to a smart phone with a link to accept or reject a potential appointment. Similarly, in one or more embodiments, a system administrator and/or provider using system administrator terminal 457 or provider terminal 447, respectively, may enter information about a cancelled appointment, and/or confirm/accept a new appointment accepted by a user at their electronic device 437.

In one or more embodiments, a first administrator terminal 457 and/or a provider terminal 447 may communicate with an Electronic Health Record (EHR) system 455. EHR system 455 may include patient and provider schedules, patient records such as contact and health information, and additional sensitive information. EHR system 455 may communicate with an integration module 450. In one or more embodiments, integration module 450 may process (e.g., abstract) information received from EHR system 455 such that other portions of system 400 and methods described herein can communicate with various types of EHR systems 455. In various embodiments EHR system 455 may implement the HL7 (Health Level Seven) Version 2 standard, or another standard which is often supported by different EHR systems 455. In some embodiments, an integration module may convert only portions of information provided by EHR systems 455, such as appointment slots, while other information may not be abstracted by integration module 450. In one or more embodiments, integration module 450 may extract information about a provider's schedule (provider information) and/or patient information and send that information into an appointments database 410 and/or patient database 415.

Appointment information may be sent from integration module 450 to scheduler 405. Scheduler 405 may identify preexisting appointments and potential appointments, wherein a preexisting appointment could be rescheduled to the potential appointment (e.g., a potential appointment may be an open time in a provider's schedule, a location, etc.). Scheduler 405 may run processes 407 periodically to determine whether new preexisting appointment and potential appointment combinations exist, whether new combinations have become available, whether a patient should be sent a message asking whether they'd like to reschedule their appointment, whether a patient should be sent a message reminding them of an appointment, etc.

In one or more embodiments, system 400 may include an appointments database 410 and/or a patients database 415. More or fewer databases may exist in various embodiments. In some embodiments, appointments may include some or all potential appointments and preexisting appointments, provider schedules, location schedules, etc. Patients database 415 may include a patient's preexisting appointments, and/or other patient information such as health information, health insurance information, etc.

In one or more embodiments, system 400 may include an administrator application programming interface (API) 460. Administrator API 460 may be capable of receiving input from various administrators via a communication platform 470 (e.g., slack), the second administrator terminal 477, etc. In some embodiments, the first administrator platform 457 may access and send information to administrator API 460. In some embodiments, first administrator terminal 457 and second administrator terminal 477 may be the same administrator terminals, and/or may access/input information into communication platform 470. In other words, it is envisioned that in some embodiments, any electronic device (which may be an administrative terminal, or any electronic device other than the client's electronic device 437) may send information to administrator API 460 directly, and/or indirectly (e.g., via communication platform 470).

In one or more embodiments, a set of approvals may be accessed by a system. Approvals may be suggestions for the content included in messages to send to patients. For example, scheduler 405, or another module, may generate a message to send to a patient asking whether they'd like to move their preexisting appointment to potential appointment. As described above, the generation of this message may include steps including, but not limited to: determining a preexisting patient appointment and a potential appointment, determining whether the location is preferable/closer to a patient, types of insurance accepted by a provider, type of insurance used by patient, type of healthcare visit (e.g., one that is life threatening as opposed to a cosmetic issue), a likelihood that a patient will cancel an appointment, an amount of patient no-shows, services that a provider is credentialed to provide, and provider specialty.

In one or more embodiments, an administrator may provide input into a system 400 (e.g., via administrator API 460) approving or disapproving a message. For example, an administrator may review a message and determine that the time of the potential appointment is not appropriate. In response, the administrator may cause the system to not send the message, and/or update its policies (e.g., so that the same error doesn't occur in the future). In various embodiments, one or more approvals may be stored in an administrative approval queue 477, which may be a database. Further, in some embodiments, configurations 465 may be stored, which may be used to assist scheduler 405 create appointments and generate reminders. Configurations 465 may be sent to a policy API 467, which may compile or otherwise integrate configurations 465. In one or more embodiments, some, all, real, or mock messages and/or suggested rescheduling of appointments created by a system may be reviewed by an administrator for approval or disapproval, to cause a system to modify its processes. Of course, this is just one example of a system that allows an administrator to approve or disapprove of the potential rescheduling of appointments and/or messages to send to patients, and other configurations are contemplated.

In one or more embodiments, system 400 may include a patient conversation manager 420. Conversation manager 405 may receive input from scheduler 405, send and receive information about patient conversations 405, coordinate sending messages via mobile communications to a client electronic device 437, and/or coordinate virtual visits 442 between a provider and a patient. In some embodiments, patient conversations 405 may include text messages sent to or from system 400, and may be stored in a database.

In one or more embodiments, patient conversation manager 420 may send text messages via a webhook 430 and a mobile communications platform 435. In one or more embodiments, webhook 430 (which may be a reverse API) may push and/or transform data (e.g., the message) to mobile communications platform 435 which may process the data such that client electronic device 437 is able to read it and respond to it regardless of the type of device and applications it uses to display text messages.

As should be understood by one of skill in the art, utilizing webhook 430 and/or mobile communications platform 435 may be preferable to traditional ways of rescheduling patient appointments because it allows for fast, real-time information. Traditionally, a schedule administrator would need to call many patients to tell them that an appointment was available. Systems described herein, however, may send multiple messages to multiple patients simultaneously, and receive responses to those messages quickly (because, for instance, patients may be able to quickly pull up their calendar on their mobile device and simply click a link to accept or reject the potential appointment). Also, once a potential appointment is taken, a system may send multiple messages to multiple patients alerting them that the potential appointment was filled, or alerting them that their preexisting appointment will be rescheduled. Previously, resources were wasted having someone call multiple patients one-by-one.

In one or more embodiments, system 400 is configured to provide a provider and a patient with virtual visits 442. In some embodiments, a patient conversation manager 420, a scheduler 405, a video conferencing platform 445, and/or a database of virtual visit information may communicate with a virtual visit API 440. For instance, a provider terminal 447 and a patient 437 may click on a link—which may be included in a text message—and have a conversation using a video conferencing platform 445. Information may be provided to the video conferencing platform by virtual visit API 400, which may send information associated with the virtual visit to a database of virtual visits 442 and/or a patient conversation manager 420. In one or more embodiments, scheduler 405 may provide a virtual visit API 440 and/or video conferencing platform 445 with information indicating which provider and patient to connect and at what time. Due to strict laws and regulations throughout the world regarding healthcare, such a system may be preferable than today's methods of rescheduling appointments, accessing EHR, and sending text messages to patients due to its approach which is both safe and streamlined.

Again, it should be appreciated that system 400 is only one example. For instance, it is envisioned that an "EHR" system may claim to incorporate some or all of the elements included in system 400. Also, it should be understood that more or fewer elements may exist in example system 400, various elements may be combined in example system 400, various elements may be modified to perform more, fewer, or different processes in example system 400, and/or various elements may communicate with other elements in ways not shown in example system 400.

Figure 5:
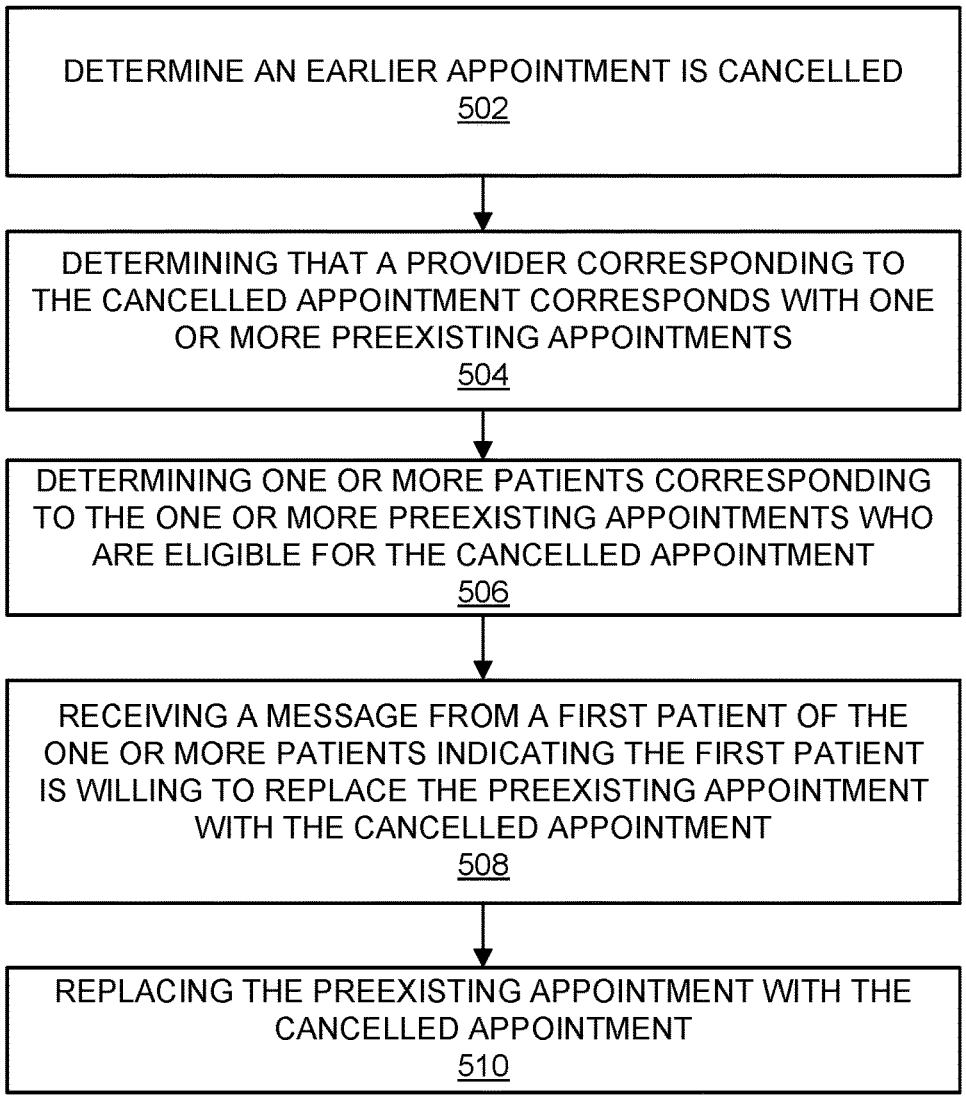
FIG. 5 illustrates a flowchart of a method for scheduling and/or rescheduling appointments, in accordance with one or more embodiments of the invention.

FIG. 5 illustrates a flowchart 500 of a method for scheduling and/or rescheduling appointments, in accordance with some embodiments.

In STEP 502 a system receives a notice of a cancelled appointment. For example, a patient may send a message to a system (e.g., system 400) indicating that they would like to cancel their appointment. In some embodiments, the appointment may be cancelled by a system automatically, or an administrator may review the request to cancel the appointment and approve it. In one or more embodiments, the cancelled appointment may be removed from a schedule (e.g., a provider's schedule), and the opening in the schedule may be referred to as a potential appointment. Thus, herein the terms potential appointment, open appointment, empty appointment slots, and cancelled appointment may be used interchangeably where appropriate, as would be understood by one of skill in the art.

In STEP 504 future appointments of a provider that correspond to the cancelled appointment are determined in response to receiving the notice of the cancelled appointment. In one or more embodiments, a future appointment of a provider corresponds to a cancelled appointment if the provider for the cancelled appointment is the same as the provider of the future appointment.

In STEP 506 one or more patients corresponding to future appointments who are eligible for the cancelled appointment are determined. For example, a system may determine which patients, out of a set of patients, can reschedule their preexisting appointments to the cancelled appointment. This determination may be made based in part on policies, which may be modified by an administrator. In one or more embodiments, the determination may be based at least in part on: a type of insurance a provider accepts, a type of insurance a patient is using, a location of a provider, patient information such as their location, whether the preexisting appointment was with the same provider, the time of the preexisting appointment and the cancelled appointment, whether the preexisting appointment is before the cancelled appointment, etc. In one or more embodiments, eligible patients include those patients having preexisting appointments with providers other than the provider corresponding with the cancelled appointment.

A message may be sent to a patient based on the result of the determination in STEP 506. The result of the determination may be sent to a system administrator who may indicate that the determination is correct or incorrect. In one or more embodiments, in response to the indication by the administrator, a system's processes and/or policies may be changed. It is further contemplated that systems described herein may implement machine learning and/or artificial intelligence to assist with rescheduling appointments. In some embodiments, input from a system administrator may be used to train a system.

In STEP 508 a message is received from one or more patients indicating that they will replace their future appointment with the cancelled appointment. For example, in response to a determination that a patient should be sent a message asking if they would like to reschedule their appointment, a system may send that message to a patient, and a patient may respond with a message accepting the proposed rescheduling of their preexisting appointment. In one or more embodiments, a system may respond to the received message accepting the rescheduling with a message indicating that the rescheduling will not occur, for example, if another patient accepted the proposed rescheduling sooner.

In STEP 510 one of the patients that indicated that they will replace their future appointment with the cancelled appointment's future appointment is replaced with the cancelled appointment. For example, their future appointment is cancelled, and their new appointment either: (1) takes place at the time of the cancelled appointment; (2) takes place with a different provider than the provider of the cancelled appointment; and/or (3) takes place at a different location than the location of the cancelled appointment.

Figure 6:
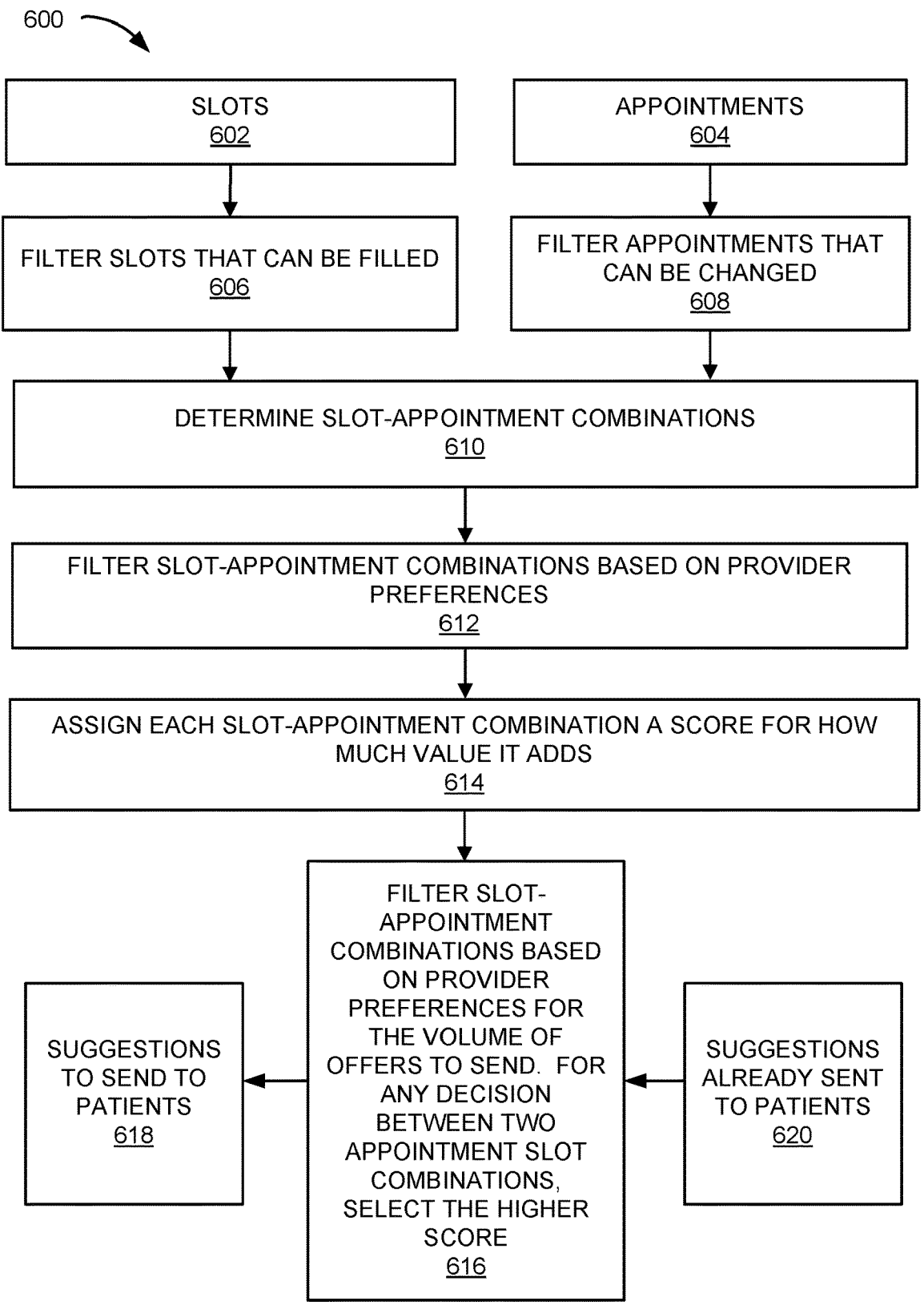
FIG. 6 illustrates a flowchart of a method for scheduling and/or rescheduling appointments, in accordance one or more embodiments of the invention.

FIG. 6 illustrates a flowchart 600 of a method for scheduling and/or rescheduling appointments, in accordance with some embodiments.

In STEP 602 slots are determined. These slots may include scheduled appointments with various providers at various locations that accept various insurances and/or specialize in a particular branch of medicine. For example, slots may be 15, 20, 30, 45, or 60-minute slots in a provider's schedule, and may be in one or more days. These slots may be identified as filled, empty, partially filled (e.g., in the case of double or triple booking), cancelled (e.g., in response to a provider having a filled appointment that was cancelled), and/or movable. In one or more embodiments, a cancelled slot may also be referred to as an empty slot.

In STEP 604 appointments are determined. Appointments may include patient appointments. In other words, in one or embodiments, slots may refer to times in a provider's schedule, and appointments may refer to a patient's preexisting appointment.

In STEP 606, slots that can be filled are determined. For example, a system may perform a method where a provider's slots that can be filled are determined (or filtered). These slots may be openings that were created because a patient cancelled their appointment, a provider's capacity increased, etc.

In STEP 608, appointments that can be changed are determined. For example, all appointments may be able to be changed, or only some of the scheduled appointments may be changed. Whether an appointment may be changed may be based on appointment attributes, which may include patient and/or provider attributes. For example, a system may determine that an appointment may be changed if: the change includes rescheduling of the time of the appointment only (e.g., because a patient does not want to change locations or physicians), the change includes a change in location within a particular area, the patient has access to transportation (e.g., a car. public transportation), the patient has indicated they would like an earlier appointment if possible, etc.

In STEP 610, slot-appointment combinations (also referred to as appointment-slot combinations herein) are determined. Appointment-slot combinations may include slots (e.g., times) where an appointment may be rescheduled to. For example, a provider's schedule may be reviewed by a system which determines that an obstetrician has an open slot the next day (e.g., "tomorrow") at 11:30 a.m. in Santa Monica, and appointments may be reviewed by a system which determines a patient has an appointment with a different obstetrician in 4 days at 9:00 a.m. in downtown Los Angeles. In one or more embodiments, a slot-appointment combination between a particular slot and a particular appointment may be determined to exist based at least on this information.

In STEP 612, appointment-slot combinations are filtered by provider preferences. For example, a provider may prefer a particular location, time, patient's health insurance, etc. If certain criteria are not met, the method will not proceed to STEP 614. Of course, appointment-slot combinations may be filtered by patient preferences such as whether they can/would like to travel to a certain distance from their home or work, whether the provider (e.g., obstetrician) is a male or female, or other attributes of a provider (e.g., location, type of health insurance accepted, etc.).

In STEP 614, each appointment-slot is assigned a score based on a value it adds. For example, an appointment-slot score may be higher if the appointment is for a week away, the slot is for two days away, the slot is at the same location with the same provider, etc., and an appointment-slot score may be lower if the appointment is two days away at 10:00 a.m., the slot is two days away at 9:30 a.m., the slot is at a less preferable location (e.g., far from the patient's home or work), the slot is with a different provider, etc. Of course, these are just some examples of attributes of slots and appointments that may be considered when assigning a score, and many more are contemplated.

In STEP 616, slot-appointment combinations are filtered based on provider preferences (e.g., for the volume of offers to send). In one or more embodiments, slot-appointment combinations with a score or below a threshold amount are selected, and in some cases, messages may be sent to patients (e.g., who had the appointment) asking them if they'd like to reschedule to the time of the slot. In some embodiments, messages are sent in an order based on the score (or a ranking otherwise). In some embodiments, only a certain number of messages may be sent to patients. In one or more embodiments, if a decision must be made between to slot-appointment combinations the one with the higher score is selected.

In STEP 618, suggestions for available appointments are sent to patients. Available appointments are appointments where a slot-combination has been determined, and in some cases, has been filtered based on provider preferences and/or has a score above or below a threshold amount.

In STEP 620, suggestions already sent to patients are determined, and in one or more embodiments, provided to step 616 such that step 616 doesn't send a suggestion for a rescheduling to a patient that has already received the suggestion. In one or more embodiments, this is similar to STEP 340 of FIG. 3.

Figure 7:
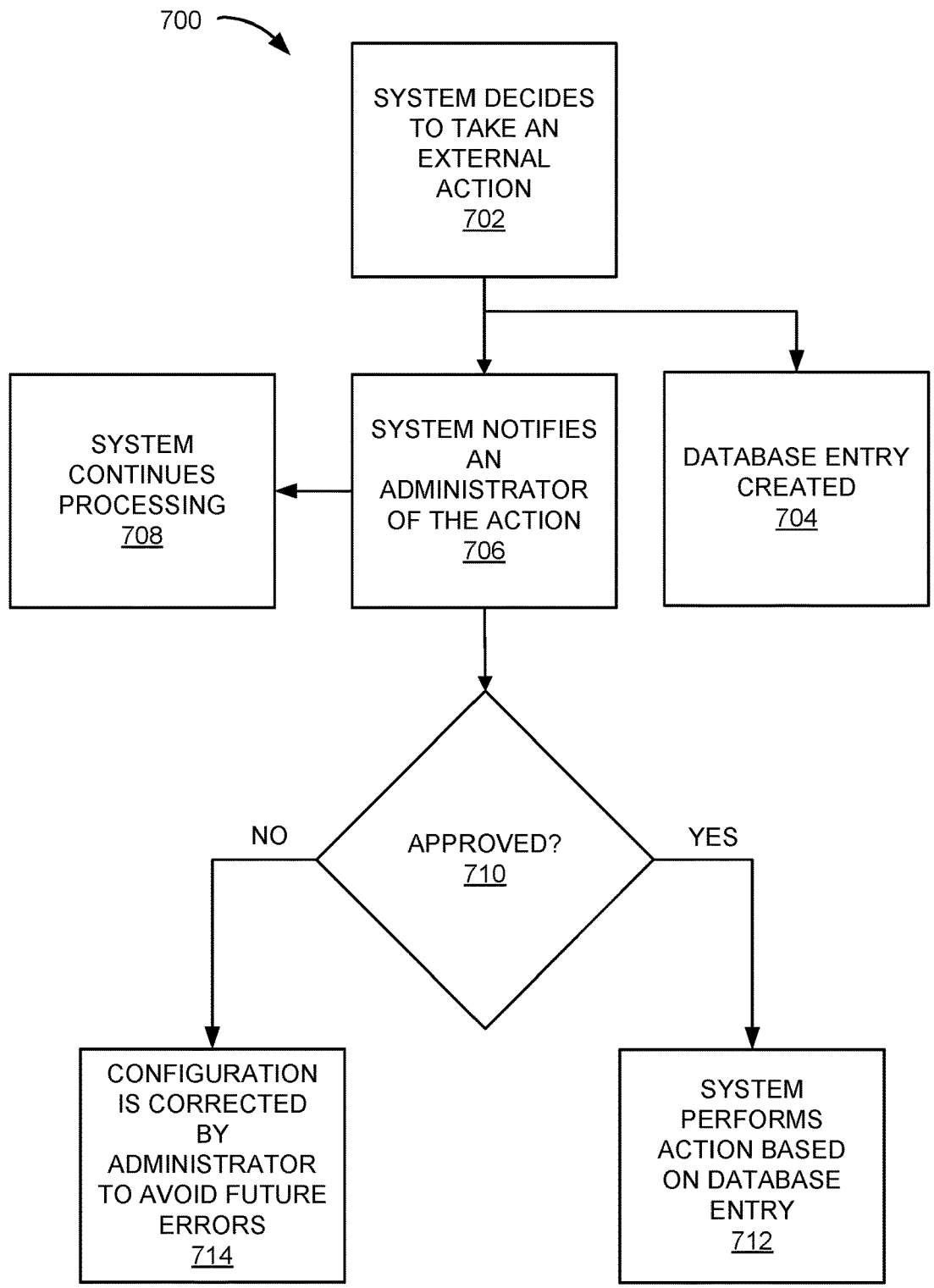
FIG. 7 illustrates a flowchart of a method for validating automated actions, in accordance with one or more embodiments of the invention.

FIG. 7 illustrates a flowchart of a method for validating automated actions, in accordance with some embodiments.

In STEP 702 a system decides to take an action. For example, the action could be rescheduling a patient's appointment or sending an appointment reminder notification to a patient. This action may be performed by the scheduler 405 included in FIG. 4.

In STEP 704 a database entry is created. For example, an entry may be created that includes an appointment identification number, a patient name, provider information, and/or a location of the appointment.

In STEP 706 a system notifies an administrator of the action. For example, an administrator may receive information about the external action that the system has decided to take at an administrator terminal (e.g., the second administrator terminal 477 in FIG. 4. The administrator may be asked to approve or deny the decision at STEP 710, described below.

In STEP 708 a system continues to process appointments. For example, a system may continue to perform external actions after it notifies an administrator of an external action. In some embodiments, processing may include sending additional actions to administrators and/or performing some actions without sending them to an administrator (e.g., for approval).

In STEP 710 whether an administrator approves of the request is determined. If the administrator approves of the request the method proceeds to step 712. If the administrator does not approve of the request, the method proceeds to step 714.

In STEP 712 the system may perform an action based at least in part on the database entry. For example, a database entry may include information about an appointment, provider, patient, location, insurance, etc., and may be used to generate a new appointment, and/or generate a message to send to a patient and/or provider.

In Step 714 a configuration is corrected to avoid future errors. For example, a configuration file and/or policies may be modified such that a particular patient doesn't see a particular provider based on insurance reasons, or for example, if the patient and provider begin a relationship which precludes the patient from seeing the provider. As another example, an administrator may disapprove of an action because the action was incorrect (e.g., an appointment was scheduled for a time later than the preexisting appointment, or an appointment was scheduled with a provider that was not credentialed).

FIG. 8 illustrates a flowchart 800 of a method for identifying patients as being related based on scheduling metadata, in accordance with some embodiments.

In STEP 802 appointment A is identified.

In STEP 804 appointment B is identified.

In STEP 806 a determination is made as to whether appointment A and appointment B were made within a particular amount of time between each other. For example, a determination may be made by a system determining that appointment A was made within 10 minutes of appointment B. If they were made within a particular amount of time of each other, the method may proceed to STEP 810, and identify the patients as being related. If not, the method may proceed to STEP 808.

In STEP 808 a determination is made as to whether appointment A and appointment B were scheduled to overlap or be adjacent to one another. If they were, the method may proceed to step 810. If not, the method may proceed to step 812.

In STEP 810 patients are identified as being related based on scheduling metadata. Scheduling metadata may include an appointment time, an appointment location, a health care plan, etc. In some embodiments, if patients are identified as being related, certain actions may occur. For example, they may not be asked to reschedule their appointments (e.g., unless another set of appointments with similar attributes such as location or time becomes available). In one or more embodiments, whether patients are related may be used to determine a score for one or more slot-appointment combinations. In one example, if patients are determined to be related and currently have appointments at different locations, the patients may be more likely than other patients to receive messages suggesting a rescheduling causing their appointments to be at the same location.

In STEP 812 patients are not identified as being related to one another based at least in part on the scheduling metadata.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Figure 9:
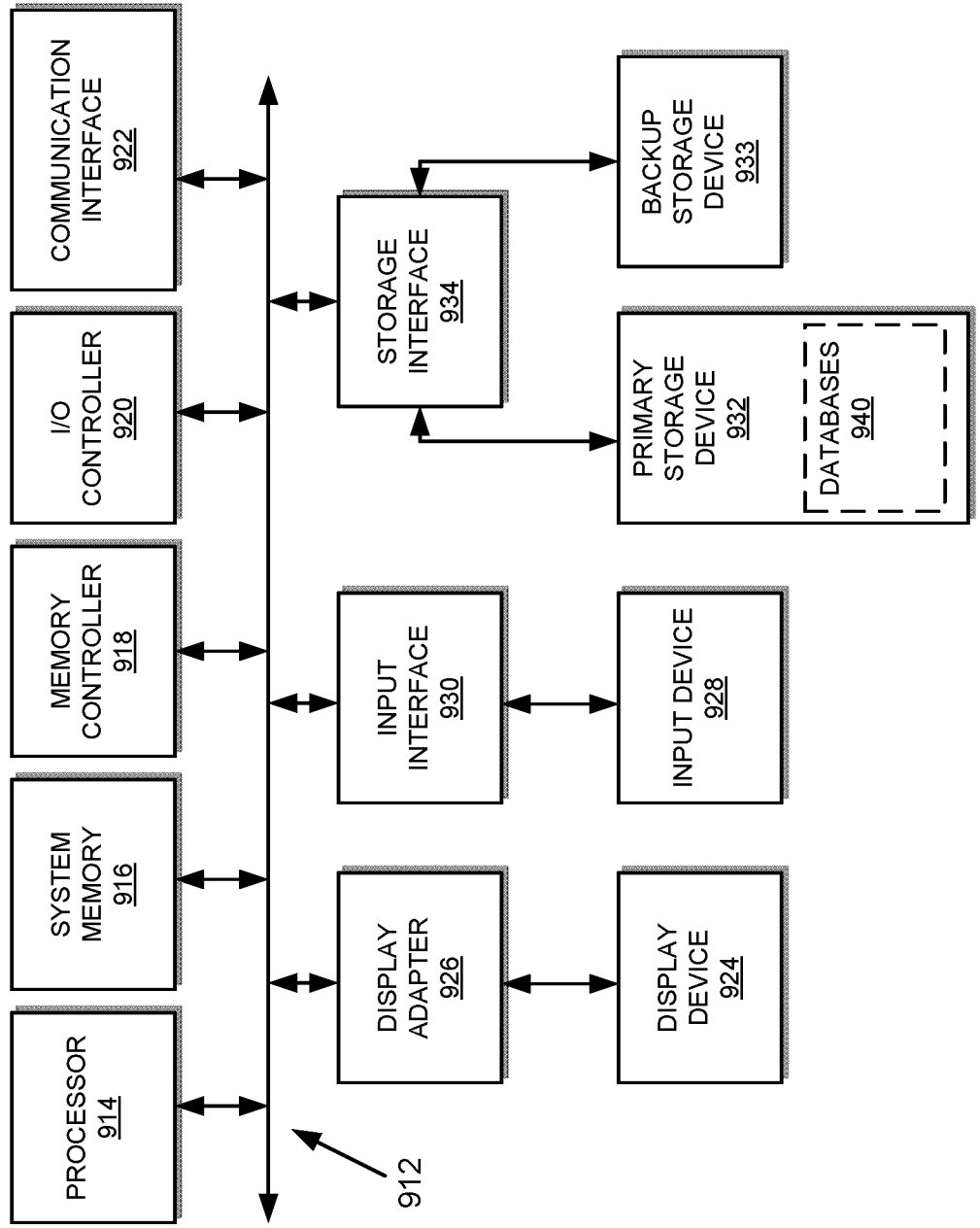
FIG. 9 illustrates a block diagram of an example of a computing system, in accordance with one or more embodiments of the invention.

FIG. 9 is a block diagram of an example of a computing system 999 capable of implementing embodiments of the present disclosure. Computing system 999 broadly represents any single or multi-processor computing device or system capable of executing computer-readable instructions. Examples of computing system 999 include, without limitation, workstations, laptops, client-side terminals, servers, distributed computing systems, handheld devices, or any other computing system or device. In its most basic configuration, computing system 999 may include at least one processor 914 and a system memory 916.

Processor 914 generally represents any type or form of processing unit capable of processing data or interpreting and executing instructions. In certain embodiments, processor 914 may receive instructions from a software application or module. These instructions may cause processor 914 to perform the functions of one or more of the example embodiments described and/or illustrated herein.

System memory 916 generally represents any type or form of volatile or non-volatile storage device or medium capable of storing data and/or other computer-readable instructions. Examples of system memory 916 include, without limitation, RAM, ROM, flash memory, or any other suitable memory device. Although not required, in certain embodiments computing system 999 may include both a volatile memory unit (such as, for example, system memory 916) and a non-volatile storage device (such as, for example, primary storage device 932).

Computing system 999 may also include one or more components or elements in addition to processor 914 and system memory 916. For example, in the embodiment of FIG. 9, computing system 999 includes a memory controller 918, an input/output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI Express (PCIe), or similar bus) and a network.

Memory controller 918 generally represents any type or form of device capable of handling memory or data or controlling communication between one or more components of computing system 999. For example, memory controller 918 may control communication between processor 914, system memory 916, and I/O controller 920 via communication infrastructure 912.

I/O controller 920 generally represents any type or form of module capable of coordinating and/or controlling the input and output functions of a computing device. For example, I/O controller 920 may control or facilitate transfer of data between one or more elements of computing system 999, such as processor 914, system memory 916, communication interface 922, display adapter 926, input interface 930, and storage interface 934.

Communication interface 922 broadly represents any type or form of communication device or adapter capable of facilitating communication between example computing system 999 and one or more additional devices. For example, communication interface 922 may facilitate communication between computing system 999 and a private or public network including additional computing systems. Examples of communication interface 922 include, without limitation, a wired network interface (such as a network interface card), a wireless network interface (such as a wireless network interface card), a modem, and any other suitable interface. In one embodiment, communication interface 922 provides a direct connection to a remote server via a direct link to a network, such as the Internet. Communication interface 922 may also indirectly provide such a connection through any other suitable connection.

Communication interface 922 may also represent a host adapter configured to facilitate communication between computing system 999 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fiber Channel interface adapters, Ethernet adapters, or the like. Communication interface 922 may also allow computing system 999 to engage in distributed or remote computing. For example, communication interface 922 may receive instructions from a remote device or send instructions to a remote device for execution.

As illustrated in FIG. 9, computing system 999 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data for display on display device 924.

As illustrated in FIG. 9, computing system 999 may also include at least one input device 928 coupled to communication infrastructure 912 via an input interface 930. Input device 928 generally represents any type or form of input device capable of providing input, either computer- or human-generated, to computing system 999. Examples of input device 928 include, without limitation, a keyboard, a pointing device, a speech recognition device, or any other input device.

As illustrated in FIG. 9, computing system 999 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 999.

In one example, databases 940 may be stored in primary storage device 932. Databases 940 may represent portions of a single database or computing device or it may represent multiple databases or computing devices. For example, databases 940 may represent (be stored on) a portion of computing system 999 and/or portions of example network architecture 1099 in FIG. 10 (below). Alternatively, databases 940 may represent (be stored on) one or more physically separate devices capable of being accessed by a computing device, such as computing system 999 and/or portions of network architecture 1099.

Continuing with reference to FIG. 9, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 999. For example, storage devices 932 and 933 may be configured to read and write software, data, or other computer-readable information. Storage devices 932 and 933 may also be a part of computing system 999 or may be separate devices accessed through other interface systems.

Many other devices or subsystems may be connected to computing system 999. Conversely, all of the components and devices illustrated in FIG. 9 need not be present to practice the embodiments described herein. The devices and subsystems referenced above may also be interconnected in different ways from that shown in FIG. 9. Computing system 999 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 999. All or a portion of the computer program stored on the computer-readable medium may then be stored in system memory 916 and/or various portions of storage devices 932 and 933. When executed by processor 914, a computer program loaded into computing system 999 may cause processor 914 to perform and/or be a means for performing the functions of the example embodiments described and/or illustrated herein. Additionally or alternatively, the example embodiments described and/or illustrated herein may be implemented in firmware and/or hardware.

For example, a computer program for requesting advertising content for display by a thin client application may be stored on the computer-readable medium and then stored in system memory 716 and/or various portions of storage devices 932 and 933. When executed by the processor 914, the computer program may cause the processor 914 to perform and/or be a means for performing the functions required for carrying out the process described with regard to the flowcharts (discussed above).

Figure 10:
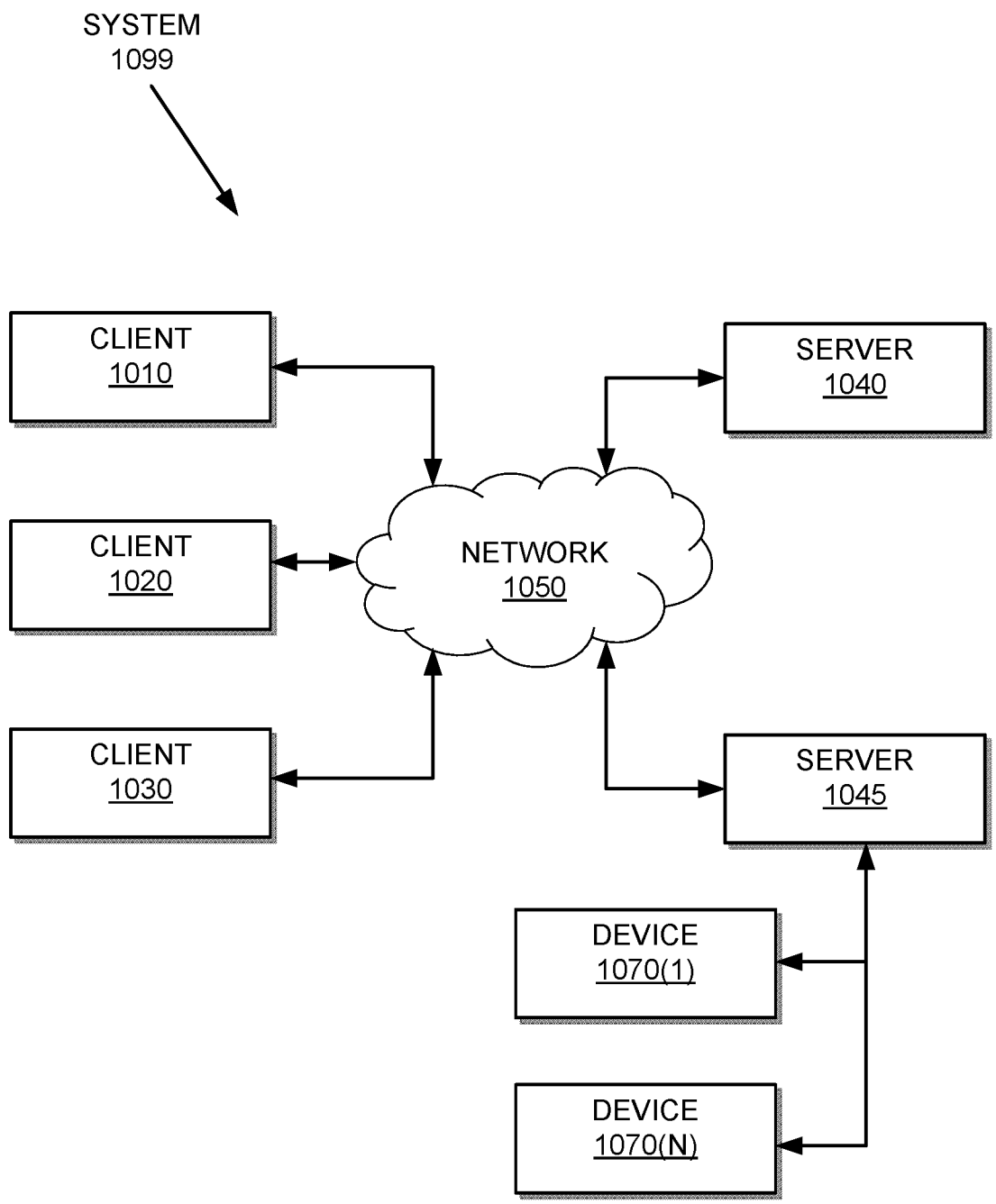
FIG. 10 illustrates a block diagram of an example of a network architecture, in accordance with one or more embodiments of the invention.

FIG. 10 is a block diagram of an example of a network architecture 1099 in which client systems 1010, 1020, and 1030 and servers 1040 and 1045 may be coupled to a network 1050. Client systems 1010, 1020, and 1030 generally represent any type or form of computing device or system, such as devices 102, 104, 106, 108, 110, and 112 of FIG. 1.

Similarly, servers 1040 and 1045 generally represent computing devices or systems, such as application servers or database servers, configured to provide various database services and/or run certain software applications (e.g., functionality of data repository 120 of FIG. 1). Network 1050 generally represents any telecommunication or computer network including, for example, an intranet, a wide area network (WAN), a local area network (LAN), a personal area network (PAN), or the Internet.

With reference to computing system 999 of FIG. 9, a communication interface, such as communication interface 922, may be used to provide connectivity between each client system 1010, 1020, and 1030 and network 1050. Client systems 1010, 1020, and 1030 may be able to access information on server 1040 or 1045 using, for example, a Web browser, thin client application, or other client software. Such software may allow client systems 1010, 1020, and 1030 to access data hosted by server 1040, server 1045, or storage devices 1070(1)-(N). Although FIG. 10 depicts the use of a network (such as the Internet) for exchanging data, the embodiments described herein are not limited to the Internet or any particular network-based environment.

In one embodiment, all or a portion of one or more of the example embodiments disclosed herein are encoded as a computer program and loaded onto and executed by server 1040, server 1045, storage devices 1070(1)-(N), or any combination thereof. All or a portion of one or more of the example embodiments disclosed herein may also be encoded as a computer program, stored in server 840, run by server 845, and distributed to client systems 810, 820, and 830 over network 850.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method for optimizing time slot yield rates, the method comprising:
   receiving an indication that a first user with a scheduled in-person appointment to see a first provider intends to cancel the in-person appointment, wherein the in-person appointment is scheduled for a first time slot;
   identifying at least one regulatory requirement associated with a geographic location of the first user;
   determining, based at least on the regulatory requirement, that a telehealth appointment during a second time slot is available, wherein the telehealth appointment is with a second provider outside of a geographic proximity of the first user;
   receiving, from the first user, acceptance of an option to book the telehealth appointment during the second time slot;
   cancelling the scheduled in-person appointment and booking the telehealth appointment for the first user;

providing, in advance of the second time slot, a video conference link to a mobile device of the first user enabling the first user to access the telehealth appointment;
identifying a set of users corresponding with preexisting scheduled time slots subsequent to the first time slot;
ranking the set of users according to ranking criteria;
selecting, based on ranking the set of users, a subset of top ranked users eligible for the first time slot;
sending a set of messages to the subset of top ranked users indicating that the first time slot is available;
receiving a message from a second user of the subset of top ranked users indicating that the second user is willing to replace their corresponding preexisting scheduled time slot with the first time slot;
replacing the second user's corresponding preexisting scheduled time slot with the first time slot;
receiving, from the mobile device of the first user, an indication that the first user is available for execution of the telehealth appointment;
receiving, from a provider terminal at a location of the second provider, a request to execute the telehealth appointment, wherein the provider terminal comprises a video camera at the location of the second provider; and
executing the telehealth appointment by connecting, via a network, a live video conference between the video camera of the provider terminal and a video camera of the mobile device of the first user.

2. The method of claim 1, further comprising:
sending a message to the second user indicating that the preexisting scheduled time slot has been replaced with the first time slot; and
sending a message to a third user of the subset of top ranked users indicating that a preexisting scheduled time slot corresponding with the third user has not been replaced with the first time slot.

3. The method of claim 1, further comprising:
sending a message to a system administrator indicating that the second user is willing to replace their corresponding preexisting scheduled time slot with the first time slot;
receiving a message from the system administrator approving replacement of the preexisting scheduled time slot with the first time slot; and
in response to receiving the approval message from the system administrator, replacing the second user's corresponding preexisting scheduled time slot with the first time slot.

4. The method of claim 1, wherein the ranking criteria is based on, for each of the set of users, at least one selected from a group consisting of the geographic location of the first user, the scheduled time of the user's corresponding preexisting scheduled time slot, a time slot category, a prior indication of time slot replacement willingness, and a position in a time slot replacement willingness list.

5. The method of claim 1, wherein the set of messages are sent in an order based on the ranking.

6. The method of claim 1, wherein the ranking criteria is based on, for each of the set of users, a relevance of a type of health condition of the user to the first provider.

7. A system for optimizing time slot yield rates, the system comprising:
a computer processor;
a memory; and
a time slot scheduling engine executing on the computer processor and configured to:
receive an indication that a first user with a scheduled in-person appointment to see a first provider intends to cancel the in-person appointment, wherein the in-person appointment is scheduled for a first time slot;
identify at least one regulatory requirement associated with a geographic location of the first user;
determine, based at least on the regulatory requirement, that a telehealth appointment during a second time slot is available, wherein the telehealth appointment is with a second provider outside of a geographic proximity of the first user;
receiving, from the first user, acceptance of an option to book the telehealth appointment during the second time slot;
cancelling the scheduled in-person appointment and booking the telehealth appointment for the first user;
providing, in advance of the second time slot, a video conference link to a mobile device of the first user enabling the first user to access the telehealth appointment;
identify a set of users corresponding with preexisting scheduled time slots subsequent to the first time slot;
rank the set of users according to ranking criteria;
select, based on ranking the set of users, a subset of top ranked users eligible for the first time slot;
send a set of messages to the subset of top ranked users indicating that the first time slot is available;
receive a message from a second user of the subset of top ranked users indicating that the second user is willing to replace their corresponding preexisting scheduled time slot with the first time slot;
replace the second user's corresponding preexisting scheduled time slot with the first time slot; and
a video conferencing platform configured to:
receive, from the mobile device of the first user, an indication that the first user is available for execution of the telehealth appointment;
receive, from a provider terminal at a location of the second provider, a request to execute the telehealth appointment, wherein the provider terminal comprises a video camera at the location of the second provider; and
execute the telehealth appointment by connecting, via a network, a live video conference between the video camera of the provider terminal and a video camera of the mobile device of the first user.

8. The system of claim 7, wherein the time slot scheduling engine is further configured to:
send a message to the second user indicating that the preexisting scheduled time slot has been replaced with the first time slot; and
send a message to a third user of the subset of top ranked users indicating that a preexisting time scheduled slot corresponding with the third user has not been replaced with the first time slot.

9. The system of claim 7, wherein the time slot scheduling engine is further configured to:
send a message to a system administrator indicating that the second user is willing to replace their corresponding preexisting scheduled time slot with the first time slot;
receive a message from the system administrator approving replacement of the preexisting scheduled time slot with the first time slot; and in response to receiving the approval message from the system administrator, replace the second user's corresponding preexisting scheduled time slot with the first time slot.

10. The system of claim 7, wherein the ranking criteria is based on, for each of the set of users, at least one selected from a group consisting of the geographic location of the first user, the scheduled time of the user's corresponding preexisting scheduled time slot, a time slot category, a prior indication of time slot replacement willingness, and a position in a time slot replacement willingness list.

11. The system of claim 7, wherein the ranking criteria is based on, for each of the set of users, a relevance of a type of health condition of the user to the first provider.

12. A non-transitory computer-readable storage medium comprising a plurality of instructions for optimizing time slot yield rates, the instructions configured to execute on at least one computer processor to enable the computer processor to:
receive an indication that a first user with a scheduled in-person appointment to see a first provider intends to cancel the in-person appointment, wherein the in-person appointment is scheduled for a first time slot;
identify at least one regulatory requirement associated with a geographic location of the first user;
determine, based at least on the regulatory requirement, that a telehealth appointment during a second time slot is available, wherein the telehealth appointment is with a second provider outside of a geographic proximity of the first user;
receive, from the first user, acceptance of an option to book the telehealth appointment during the second time slot;
cancel the scheduled in-person appointment and booking the telehealth appointment for the first user;
provide, in advance of the second time slot, a video conference link to a mobile device of the first user enabling the first user to access the telehealth appointment;
identify a set of users corresponding with preexisting scheduled time slots subsequent to the first time slot;
rank the set of users according to ranking criteria;
select, based on ranking the set of users, a subset of top ranked users eligible for the first time slot;
send a set of messages to the subset of top ranked users indicating that the first time slot is available;
receive a message from a second user of the subset of top ranked users indicating that the second user is willing to replace their corresponding preexisting scheduled time slot with the first time slot;
replace the second user's corresponding preexisting scheduled time slot with the first time slot;

receive, from the mobile device of the first user, an indication that the first user is available for execution of the telehealth appointment;
receive, from a provider terminal at a location of the second provider, a request to execute the telehealth appointment, wherein the provider terminal comprises a video camera at the location of the second provider; and
execute the telehealth appointment by connecting, via a network, a live video conference between the video camera of the provider terminal and a video camera of the mobile device of the first user.

13. The non-transitory computer-readable storage medium of claim 12, wherein the instructions configured to execute on the at least one computer processor further enable the computer processor to:
send a message to the second user indicating that the preexisting scheduled time slot has been replaced with the first time slot; and
send a message to a third user of the subset of top ranked users indicating that a preexisting scheduled time slot corresponding with the third user has not been replaced with the first time slot.

14. The non-transitory computer-readable storage medium of claim 12, wherein the instructions configured to execute on the at least one computer processor further enable the computer processor to:
send a message to a system administrator indicating that the second user is willing to replace their corresponding preexisting scheduled time slot with the first time slot;
receive a message from the system administrator approving replacement of the preexisting scheduled time slot with the first time slot; and
in response to receiving the approval message from the system administrator, replace the second user's corresponding preexisting scheduled time slot with the first time slot.

15. The non-transitory computer-readable storage medium of claim 12, wherein the set of messages and the received message are short message service (SMS) messages.

16. The non-transitory computer-readable storage medium of claim 12, wherein the ranking criteria is based on, for each of the set of users, at least one selected from a group consisting of the geographic location of the first user, the scheduled time of the user's corresponding preexisting scheduled time slot, a time slot category, a prior indication of time slot replacement willingness, and a position in a time slot replacement willingness list.

17. The non-transitory computer-readable storage medium of claim 12, wherein the set of messages are sent in an order based on the ranking.

* * * * *